D. W. C. FARRINGTON.

Cooking Stove.

No. 30,674.

2 Sheets—Sheet 1.

Patented Nov. 20, 1860.

Witnesses:
Joseph Garrett
A. E. Fisher

Inventor:
De Witt C Farrington

D. W. C. FARRINGTON.
Cooking Stove.

No. 30,674.

2 Sheets—Sheet 2.

Patented Nov. 20, 1860.

Witnesses:
Joseph Garett
A. E. Fisher

Inventor:
DeWitt C. Farrington

UNITED STATES PATENT OFFICE.

DE WITT C. FARRINGTON, OF LOWELL, MASSACHUSETTS.

COOKING-STOVE.

Specification of Letters Patent No. 30,674, dated November 20, 1860.

*To all whom it may concern:*

Be it known that I, D. W. C. FARRINGTON, of Lowell, in the county of Middlesex and State of Massachusetts, have invented certain new and useful Improvements in Cooking-Stoves; and I do hereby declare that the following description, taken in connection with the accompanying drawings hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plate of drawings represent my improvements.

Figure 1:
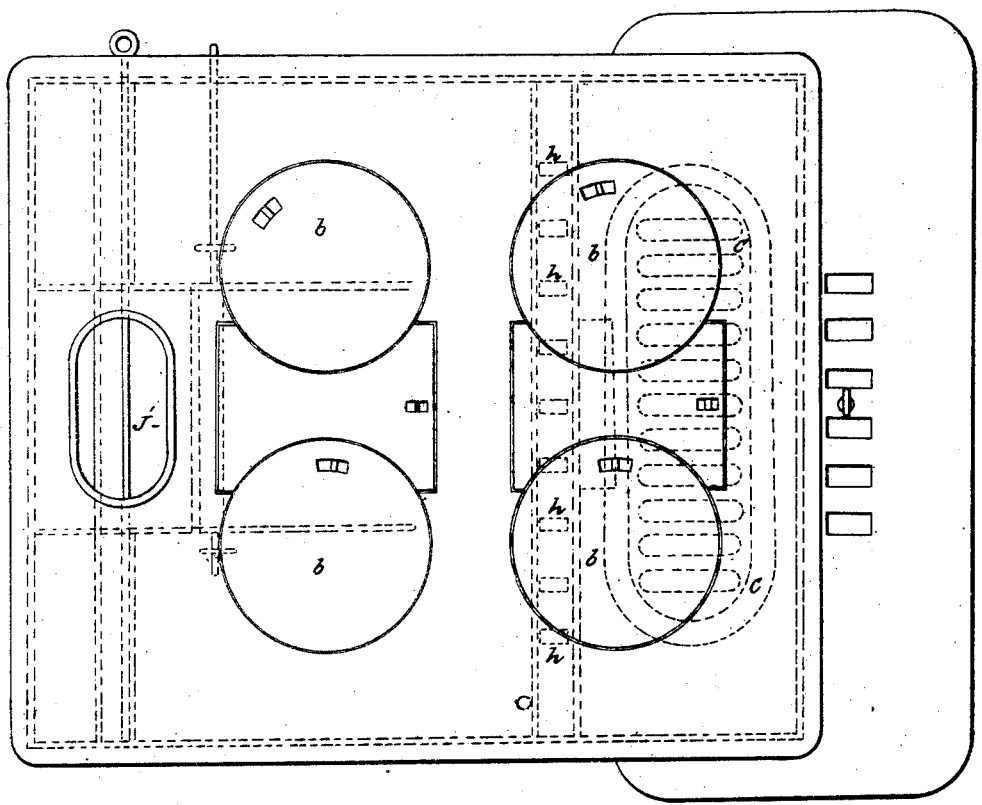
Figure 2:
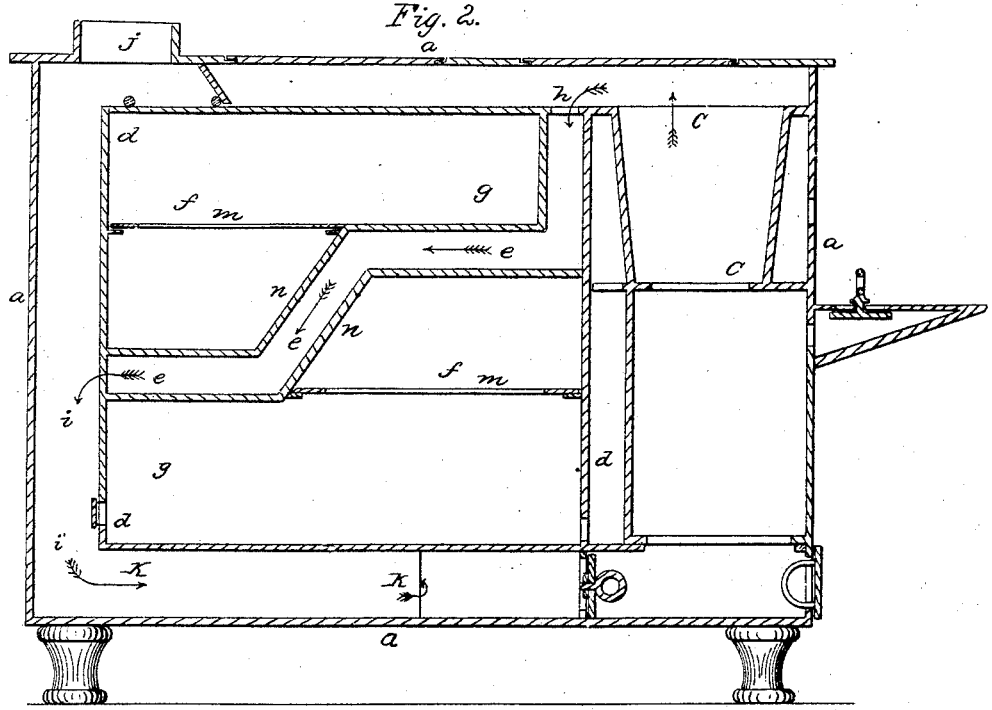
Figure 3:
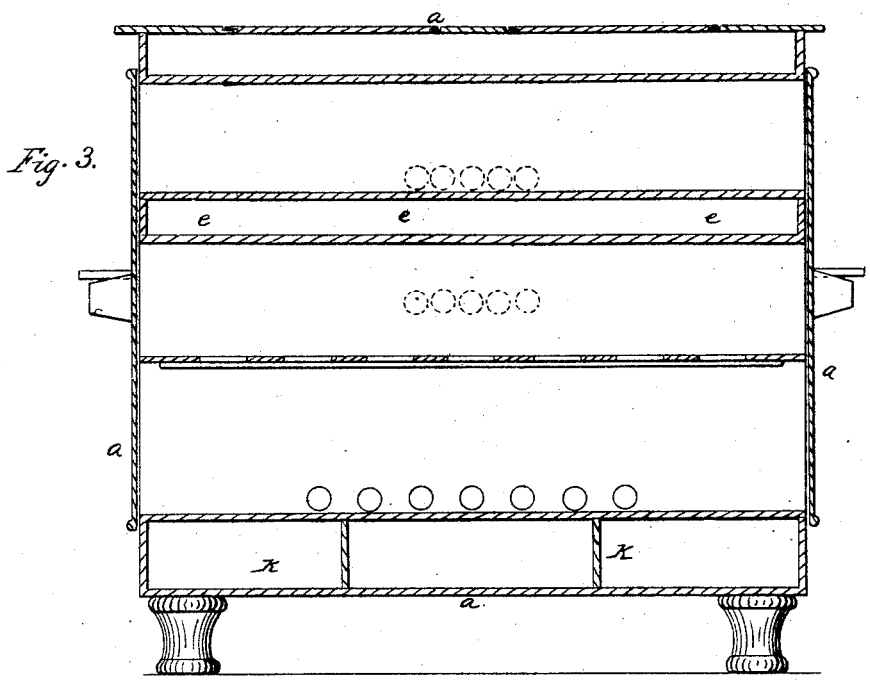

Figure 1 is a plan or top view of my improved cooking-stove. Fig. 2 is a central longitudinal vertical section of the same. Fig. 3 is a central transverse vertical section.

In the ordinary construction of cooking-stoves, the shape of oven heretofore generally used and preferred, has consisted of a deep portion thereto, and a shallow part extending under the fire-pot, the shallow part being available only for baking pastry, bread, and other small articles, while but one large joint of meat, &c., could at a time be baked in the deeper portion. This form of construction, it is evident then, does not afford large accommodation for baking purposes. By my improvements I obtain two deep portions in the oven, separated from each other, whereby two or more large joints of meat, fowl, &c., can be baked at the same time. This result I obtain by extending or lengthening out that portion of the stove that contains the fire-pot, so that it shall not extend over the oven, and then so dividing the oven space by a peculiar shaped flue, as to form two separate and distinct ovens, of the same form as those commonly used in cooking stoves, thereby obtaining two deep and two shallow compartments in the same stove, in lieu of one of each, the advantages of which, from the statements hereinbefore made, will be manifest.

$a\ a\ a\ a$ in the drawings represent the outer casing or plates of the stove; $b\ b$ &c., the boiler-spaces, and $c\ c$ the fire-pot, which is extended out in front of the oven, but not over any portion of the same.

$d\ d\ d\ d$ is the oven space through which extends a bent flue or hollow partition $e\ e\ e$, arranged as shown in Figs. 2 & 3; the flue $e\ e\ e$ divides the oven space into two separate ovens, each having a deep and shallow compartment $f$—$g$—$f$—$g$—.

The products of combustion pass from the fire-pot $c\ c$ through the apertures $h\ h$, &c., as shown by arrows in the drawings, into the bent flue $e\ e\ e$, through which they pass into a flue $i\ i$, thence into the lower horizontal flues $k\ k$—$k\ k$ and about the oven, and out at the smoke flue $j$ in the usual manner, $m\ m$ sliding racks for articles in the oven.

By the above-described arrangement it will be seen that I obtain two ovens of the desired form in lieu of one, as in the ordinary cooking stove.

I am aware that a cooking-stove has been constructed in which separate ovens were formed by means of a straight central flue, but this it will be evident does not accomplish the object of my invention, as it simply divides the oven space into two rectangular compartments, neither of which can be of sufficient depth to receive large articles to be baked, without very much increasing the size of the stove—whereas by my improvements, the oven space is so divided by the peculiar shaped flue $e\ e\ e$ as to obtain two separate ovens each of the required depth and capacity and at the same time this is effected with economy of construction, as the height of the stove is not increased thereby.

It will be evident that the form of the flue $e\ e\ e$ may be somewhat varied from that shown in the drawings, as, for instance, the elbow portion $n\ n$ thereof may form a right angle with the horizontal portion of the same, but the form described is the one I prefer.

Having thus described my improvements in cooking stoves, I shall state my claim as follows.

I do not claim broadly dividing the oven space into two ovens, by means of a central flue, as this has before been done, and would not serve the purposes of my invention, but what I do claim as my invention, and desire to have secured to me by Letters Patent, is—

Dividing the oven space by such a form of bent flue, communicating with the fire chamber, as to form thereby two separate ovens, each containing a deep and shallow portion or compartment substantially as herein above described.

DE WITT C. FARRINGTON.

Witnesses:
JOSEPH GAVETT,
A. E. FISHER.